United States Patent [19]

Mullins

[11] 4,160,507

[45] Jul. 10, 1979

[54] COMBINATION LIFT TURN-OVER/PUSH-OFF BLOCK TRANSFER APPARATUS

[76] Inventor: Wayne L. Mullins, 5001 E. Cactus, Scottsdale, Ariz. 85254

[21] Appl. No.: 822,439

[22] Filed: Aug. 8, 1977

[51] Int. Cl.² .................................................. B65G 47/52
[52] U.S. Cl. .................................. 414/749; 414/783; 414/741; 414/773; 294/62
[58] Field of Search ............... 214/1 BD, 1 Q, 147 T, 214/147 G, 1 BB; 294/62, 63 R, 63 A

[56] References Cited

U.S. PATENT DOCUMENTS

| 2,643,780 | 6/1953 | Rowe | 214/147 T |
| 3,161,431 | 12/1964 | Francis | 294/63 R |
| 3,438,515 | 4/1969 | Nowicki | 214/1 BD |
| 3,826,382 | 7/1974 | Zappia | 214/1 BD |

*Primary Examiner*—Francis S. Husar
*Assistant Examiner*—George F. Abraham
*Attorney, Agent, or Firm*—Herbert E. Haynes, Jr.

[57] ABSTRACT

After curing, cementitious blocks carried on a pallet are moved by a conveyor to a transfer apparatus which removes the blocks from the pallet and transfers them to another conveyor for delivery to a cubing mechanism. The transfer apparatus is provided with a block lift turn-over mechanism and a block push-off mechanism with those mechanisms selectively operable to provide two distinctive operational modes as necessitated by the types of blocks being transferred and the desired block attitude.

6 Claims, 16 Drawing Figures

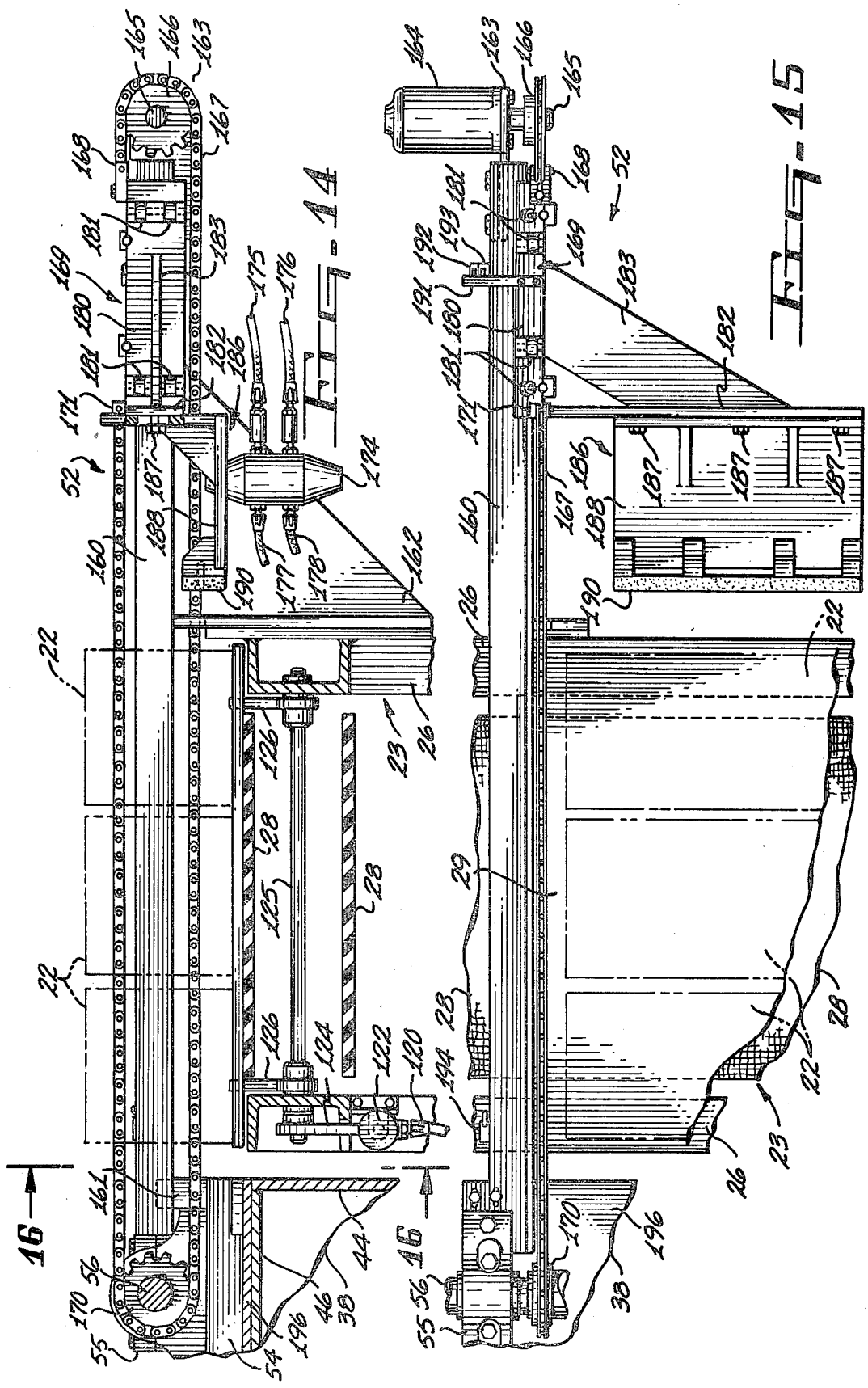

COMBINATION LIFT TURN-OVER/PUSH-OFF BLOCK TRANSFER APPARATUS

BACKGROUND OF THE INVENTION

1. Field of the Invention

This invention relates to cement block handling machines and more particularly to an apparatus for simultaneously off-loading a plurality of blocks from a pallet carried on a first conveyor and depositing them on a second conveyor, with the apparatus having two distinctive operating modes.

2. Description of the Prior Art

Devices for removing cementitious blocks from a pallet carried on a first conveyor and transferring them to a second conveyor have long been used in cement block manufacturing plants. Usually, these prior art devices simply push the blocks off of the pallet onto the second conveyor and in many instances this type of transferral is very satisfactory. However, in other instances it is desirable to turn the blocks over during the transferral and in still other instances such turnover is mandatory.

By way of explanation, some types of cementitious blocks, such as those often referred to as cap blocks, simple pushing of that type is perfectly satisfactory in that orientation of these blocks is unimportant as far as subsequent plant handling, shipping, job site handling and craftsmen preferences are concerned.

Cementitious blocks of the type which are used in conjunction with mortar for erecting building walls and the like, currently are the largest single type of cementitious block manufactured. Although not absolutely necessary, it is desirable that these mortar bonded blocks be turned over during the above described transferral operation in that skilled craftsmen who lay the blocks prefer to have the smoothest side facing up which facilitates their task. When the blocks are fabricated, the smothest surface of the block is formed by the pallet and therefor to comply with craftsmen preferences, the blocks must either be turned over at the plant or on the job site. Turning the blocks at the manufacturing plant is much easier in that machinery can be employed to accomplish the task whereas job site turning of the blocks is a manual operation.

The high cost of labor has recently prompted searches for interlocking cementitious blocks which are self-aligning and can be bonded by an adhesive rather than mortar, and blocks of this type are now appearing in the marketplace. A particular block of this type is fully disclosed in a U.S. Patent Application entitled: INTERLOCKING CEMENTITIOUS BUILDING BLOCKS, Ser. No. 799,725, Filed on May 23, 1977, now U.S. Pat. No. 4,107,894, by the same inventor. Briefly, this block is formed with an array of recesses on one surface and an identical array of projections on the opposite surface. The block is fabricated on a special pallet which, in addition to serving as a pallet, acts as a die for forming the array of projections. This special combination of pallet and die is fully disclosed in U.S. Pat. No. 3,998,423, issued Dec. 21, 1976 to the same inventor and entitled: COMBINATION DIE AND PALLET. Since the array of projections of this particular type of block are formed by the special die and pallet, those projections face downwardly and the blocks must be inverted upon removal from the pallet to prevent breakage, and so that the blocks can be stacked in cubes for shipping purposes.

The known prior art devices for removing blocks from a pallet and transferring them from one conveyor to another are single function devices. That is, a first general type of mechanism is employed to push the blocks from the pallet onto the second conveyor, and a second general type of device will accomplish the removal and transfer with a turnover mechanism. To the best of my knowledge, no single apparatus has been devised or suggested which is selectively operable to accomplish both types of removal and transfer motions.

Since the prior art block removal and transfer mechanisms are single function devices, manufacturing plants must provide two separate block removal and transfer stations, i.e., one station equipped with a push-off mechanism and another station equipped with a turnover mechanism. A two station system is costly as it requires extra conveyors, power lines and the like, and occupies twice as much space as would otherwise be needed. An alternative to the two station system is one which requires time consuming equipment relocation when switching from the production of one type of block to another.

In addition to the above problems associated with the prior art single function devices, the block turnover mechanisms known to me are large cumbersome machines which are designed to invert one block at a time which produces problems with production schedules.

Therefore, a need exists for a new and improved selectively operable multi-operational mode apparatus for simultaneously removing a plurality of cementitious blocks from a pallet on a first conveyor and transferring them to another conveyor, with this apparatus overcoming some of the problems and shortcomings of the prior art.

SUMMARY OF THE INVENTION

In accordance with the present invention, a new and improved block removal and transfer apparatus is disclosed which is a combination apparatus that is selectively operable to either push the blocks from the pallet onto a conveyor or may accomplish the removal and transfer function by lifting and turning the blocks over.

The combination transfer apparatus is positioned normally with respect to a first conveyor, upon which blocks carried on pallets are transported, and a second conveyor which is aligned with the normal orientation of the apparatus. The apparatus includes a stand which adjustably supports a frame structure that carries a turn-over mechanism and a push-off mechanism, with those two mechanisms sharing some common control devices and each having some individual control devices.

The block lift and turnover mechanism includes a swing arm operable through an arc of approximately 180° between a block pick-up position on the first conveyor and block delivery position on the second conveyor. The swing arm is provided with suitably controlled clamping means for simultaneously engaging a plurality of blocks at the pick-up position and delivering those blocks in an inverted attitude to the delivery position on the second conveyor.

The push-off mechanism includes an elongated rail which extends from the frame transversely over the first conveyor and has a carriage with a pusher assembly mounted thereon. When the carriage is actuated, it will move into engagement with a plurality of blocks and will push them off of the pallet across the top of the frame and onto the second conveyor.

Each of the mechanisms described above is provided with power means and control means suitable for accomplishing the necessary functions, such as reciprocally moving the carriage on the rail, and for reversing the arcuate travel of the swing arm. In addition to those individual controls, the apparatus is provided with common control means such as means for selective operation of one or the other of the mechanisms, means for sensing the arrival of the pallet and blocks at the pick-up position on the first conveyor, means for precision position of the pallet and blocks at the pick-up position, and means for controlling the operation of the first and second conveyor.

Accordingly, it is an object of the present invention to provide a new and improved cementitious block handling machine.

Another object of the present invention is to provide a new and improved cementitious block handling machine for simultaneously removing a plurality of blocks from a pallet on a first conveyor and delivering those blocks to a second conveyor.

Another object of the present invention is to provide a new and improved apparatus for simultaneously removing a plurality of cementitious blocks from a pallet on a first conveyor and delivering those blocks to a second conveyor in an inverted position.

Another object of the present invention is to provide a new and improved apparatus for simultaneously pushing a plurality of cementitious blocks off of a pallet on a first conveyor onto a second conveyor.

Still another object of the present invention is to provide a new and improved apparatus which is selectively operable to either simultaneously remove a plurality of blocks from a pallet on a first conveyor and transfer those blocks to a second conveyor in an inverted position, or simultaneously push a plurality of blocks off of the pallet onto the second conveyor.

The foregoing and other objects of the present invention, as well as the invention itself, will be more fully understood from the following detailed description when read in conjunction with the accompanying drawings.

BRIEF DESCRIPTION OF THE DRAWINGS

FIG. 14 is an enlarged fragmentary sectional view taken on the line 14—14 of FIG. 2.

FIG. 15 is a plan view of the apparatus shown in FIG. 14.

DESCRIPTION OF THE PREFERRED EMBODIMENT

Figure 1:
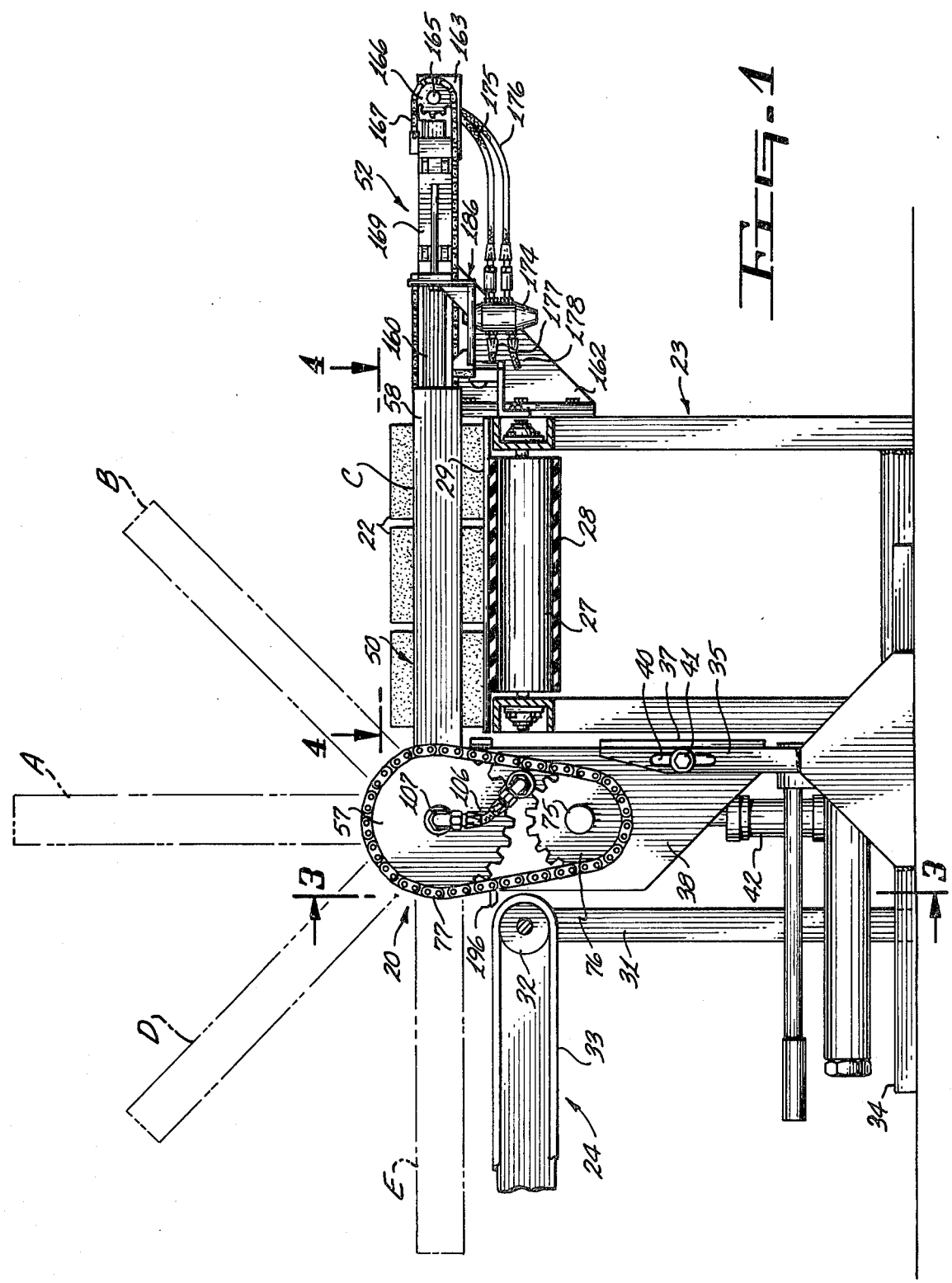
FIG. 1 is a side elevational view of the combination lift turn-over/push-off block transfer apparatus of the present invention illustrating the various features thereof.
Figure 2:
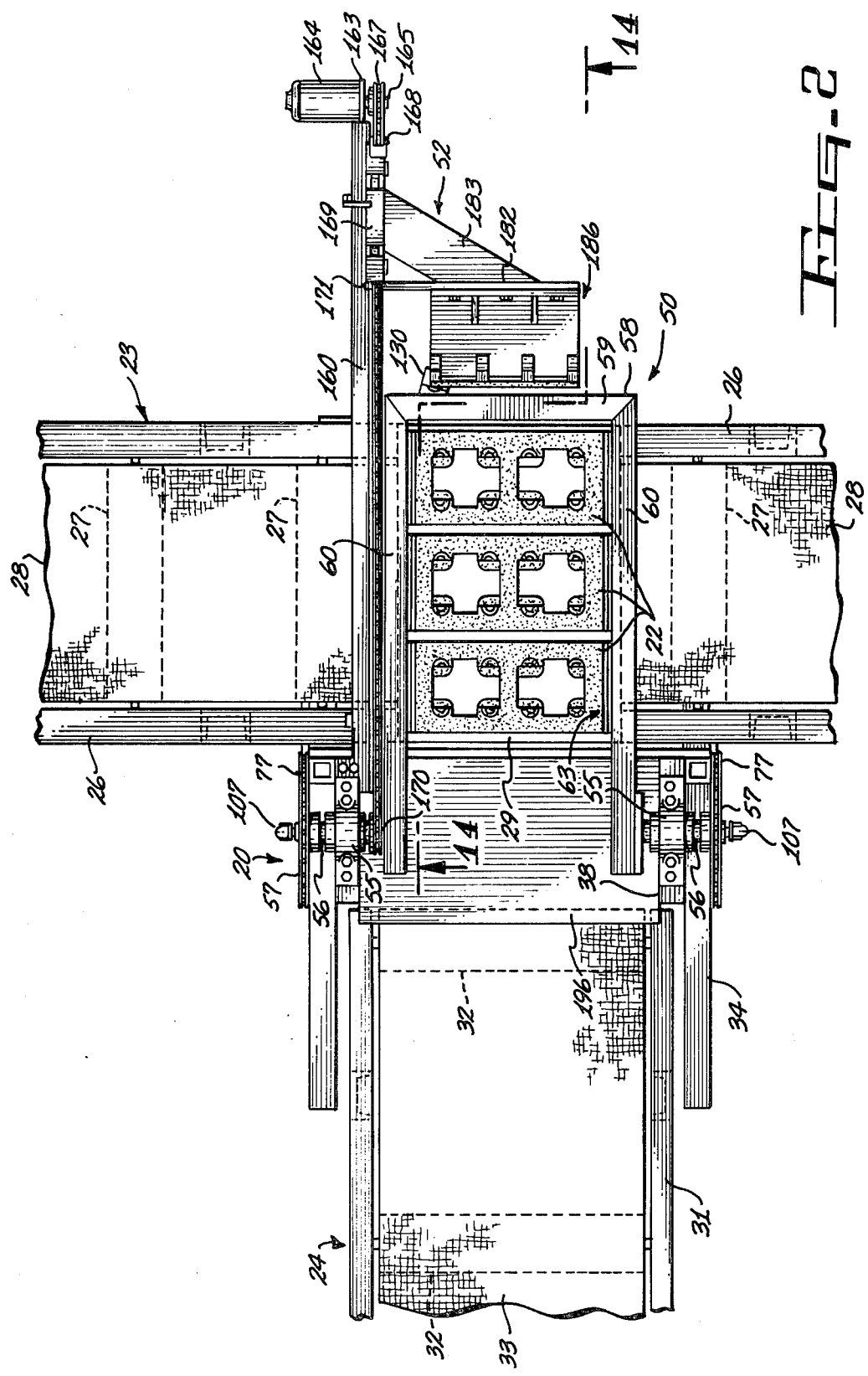
FIG. 2 is a plan view of the apparatus shown in FIG. 1.

Referring more particularly to the drawings, FIGS. 1 and 2 illustrate the combination lift turn-over/push-off block transfer apparatus of the present invention which is indicated generally by the reference numeral 20. As will hereinafter be described in detail, the block transfer apparatus 20 is operable to remove cementitious blocks, such as those indicated by the numeral 22, from a first conveyor 23 and place them on a second conveyor 24.

The first conveyor 23 includes a suitable frame 26 having a plurality of rollers 27 spacedly disposed along the length thereof and having an endless belt 28. The conveyor 23 is suitably driven such as by an electric motor (not shown), and is employed to move the blocks 22, carried on a pallet 29, from a curing station such as a kiln (not shown) to the block transfer apparatus 20. After the transfer apparatus 20 removes the blocks from the pallet, the first conveyor 23 moves the empty pallet through suitable cleaning equipment (not shown) to condition those pallets for reuse in block making operations.

The second conveyor 24 similarly includes a frame 31 having spaced rollers 32 and an endless belt 33, and is driven by a suitable drive means such as an electric motor (not shown). As seen best in FIG. 2, the second conveyor 24 is disposed normally with respect to the first conveyor 23 and has its block receiving end spaced laterally from the first conveyor 23 to provide a space which is occupied by the block transfer apparatus 20. The second conveyor 24 is employed to receive the blocks from the transfer apparatus 20 and transport them to a cubing station (not shown) or other station where the blocks are prepared for shipment to job sites.

Figure 3:
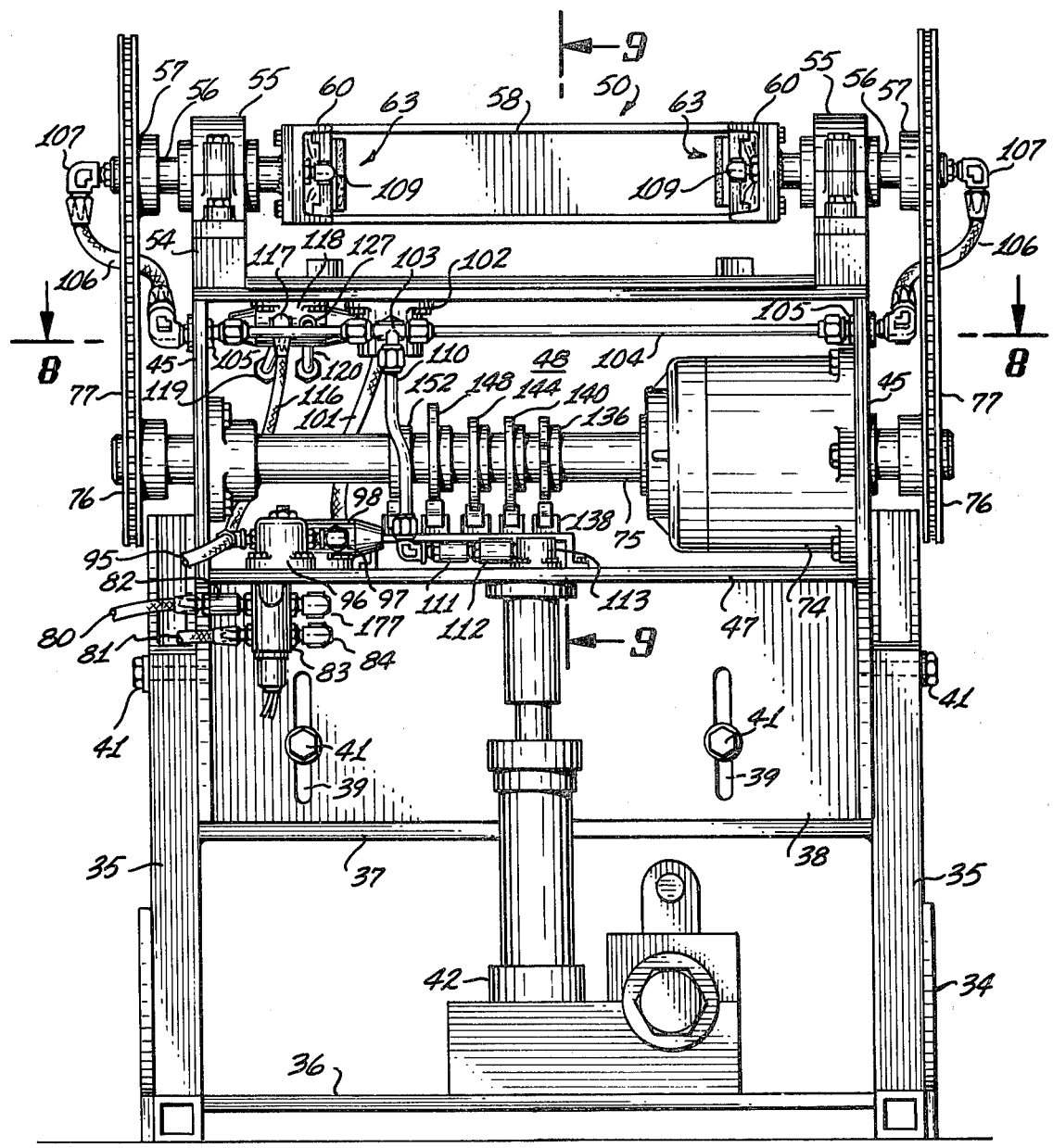
FIG. 3 is an enlarged sectional view taken on the line 3—3 of FIG. 1.
Figure 4:
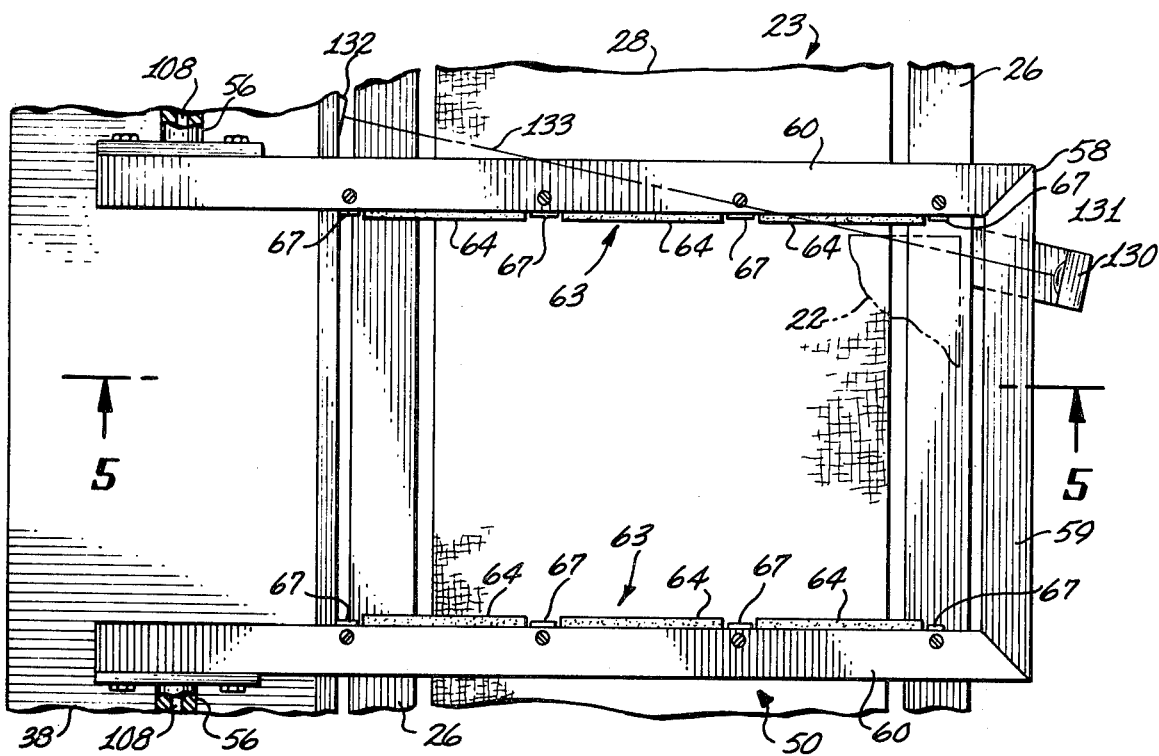
FIG. 4 is an enlarged fragmentary sectional view taken on the line 4—4 of FIG. 1.
Figure 5:
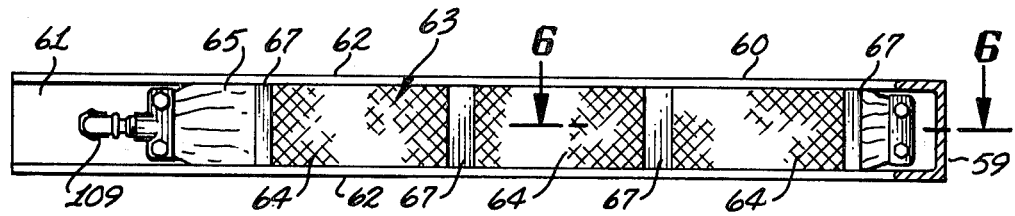
FIG. 5 is a sectional view taken on the line 5—5 of FIG. 4.
Figure 6:
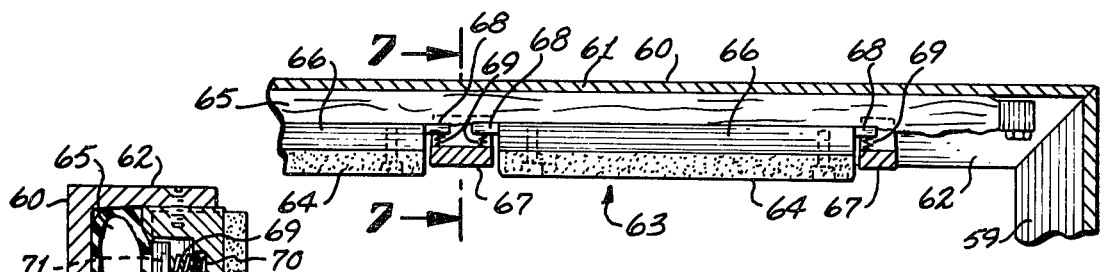
FIG. 6 is an enlarged fragmentary sectional view taken on the line 6—6 of FIG. 5.
Figure 7:
FIG. 7 is an enlarged sectional view taken on the line 7—7 of FIG. 6.

The combination lift turn-over/push-off block transfer apparatus 20, as best seen in FIGS. 1 and 3 is provided with a stand 34 having a spaced pair of uprights 35, a horizontally disposed lower plate 36 and a vertically dipposed upper plate 37. A frame 38 is carried between the uprights 35, with the frame and uprights being suitably provided with elongated slots 39 and 40, respectively, to attach the frame 38 to the stand 34 by bolts 41 thus allowing the frame to be vertically adjusted relative to the stand. A hydraulic jacking device 42 is carried on the horizontal lower plate 36 of the stand 34 and extends upwardly into engagement with the frame 38 to facilitate vertical adjusting thereof.

Figure 8:
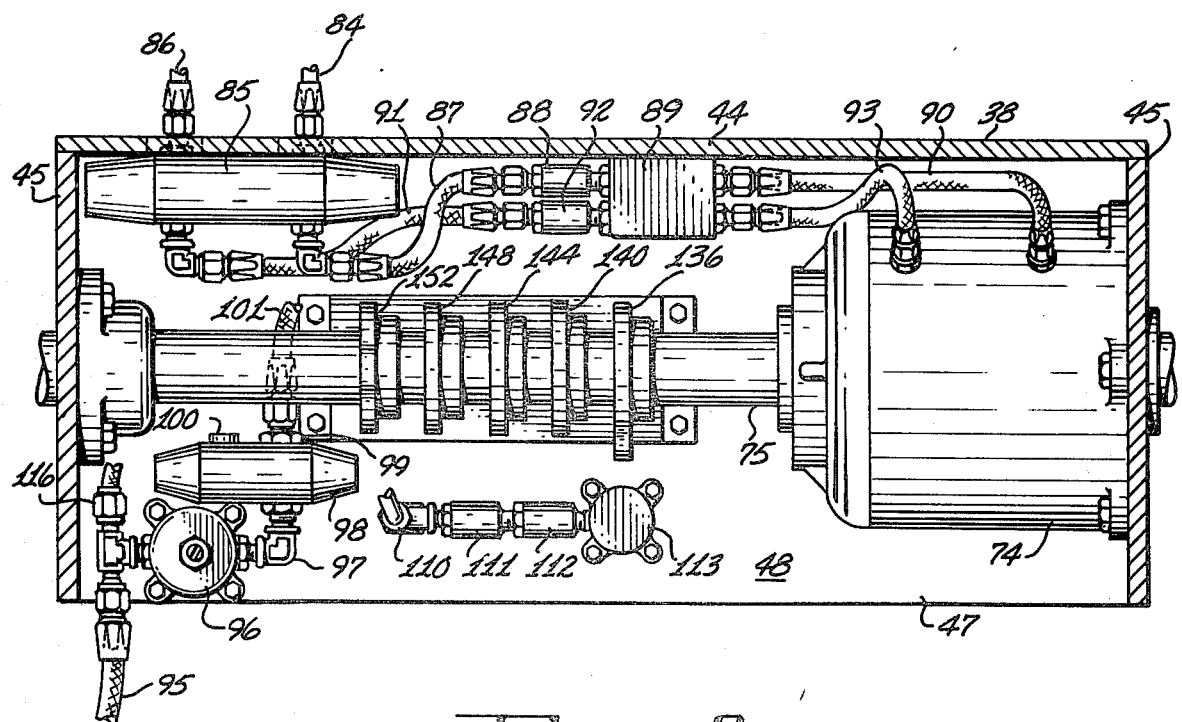
FIG. 8 is an enlarged fragmentary sectional view taken on the line 8—8 of FIG. 3.

As seen best in FIGS. 3 and 8, the frame 38 is formed with a vertically disposed end wall 44, a spaced pair of side walls 45, and has upper and lower horizontally disposed shelves 46 and 47, respectively. The upper portions of the end wall 44 and side walls 45 along with the shelves 46 and 47 define a compartment 48 in which the control devices for the apparatus 20 are mounted as will hereinafter be described in detail.

The frame 38 supports a block turnover mechanism which is indicated generally by the reference numeral 50, and also supports a block push-off mechanism which is generally indicated by the numeral 52.

The various components and operation of the block turnover mechanism 50 will now be described in detail with reference being made to FIGS. 1 through 13.

The purpose of the block turnover mechanism 50 is to remove the three cementitious blocks 22 (FIGS. 1 and 2) fom the pallet 29 carried on the first conveyor 23, and deposit those three blocks 22 on the second conveyor 24 in an inverted position. The need for such a turnover in removal motion will be appreciated upon consideration of the desire of skilled craftsmen to have the blocks arrive at a construction site with the smooth side facing upwardly. The smooth side is formed by the pallet, and bricklayers prefer to have that side facing up to facilitate the block laying task. When the apparatus 20 is being employed to handle cementitious mortarless interlocking blocks having male projections on one side thereof and female recesses on the opposite side as disclosed in the hereinbefore referenced U.S. Patent Application, the turnover removal motion is a mandatory operation so that when such blocks arrive on the second conveyor 24, the male projections will be facing upwardly.

The opposite side ends of the upper shelf 46 of the frame 38 are provided with suitably affixed spacers 54 each of which has a pillow block 55 mounted thereon. A pair of axially aligned stub shafts 46 are each rotatably carried in a different one of the pillow blocks 55 with the shafts 56 each having a sprocket 57 affixed to its outwardly disposed end. A U-shaped swing arm 58 having a bight member 59 and a spaced parallel pair of extending side legs 60, has the extending ends of the side legs 60 each affixed to the inwardly disposed end of a different one of the stub shafts 56 for rotation therewith through an arc of 180° as will hereinafter be described.

As shown in FIGS. 4 through 7, each leg 60 of the swing arm 58 is formed of an elongated channel member having a vertically disposed wall 61 with opposed flanges 62 which define an inwardly facing chamber in which block clamping means 63 are mounted. The legs 60 of the swing arm 58 each have three extensible friction pads 64 mounted in the inwardly opening chambers thereof to provide aligned pairs of those pads 64 which are movable toward each other to clampingly engage the opposite ends of the blocks.

In addition to three friction pads 64, each of the block clamping means 63 includes an elongated inflatable air bag 65 (one shown) positioned in contiguous engagement with the inwardly disposed surface of the wall 61, and with three movable mounting plates 66 (two shown) each having a different one of the friction pads 64 demountably affixed thereto. Movements of the plates 66 and pads 64 is limited by stop members 67 which are mounted so as to extend between the flanges 62 of the legs 60 and are spacedly arranged so that the stops are located at each of the opposite end edges of each of the plates 66. The plates 66 are provided with end flanges 68 extending laterally so as to be located behind the stop members 67 within the chambers of the legs 60. Suitable compression springs 69 are carried in pockets 70 formed in the inwardly facing surfaces of the stops 67 and similar aligned pockets 71 formed in the flanges 68 of the plates 66.

Thus, when the air bags 65 are inflated, the plates 66 and pads 64 will move into extended positions for clampingly engaging the blocks 22. When the air bags are deflated, the compression springs 69 will urge the plates 66 and pads 64 into the retracted position and thereby release the blocks.

Referring now in particular to FIG. 3, a drive means 74 in the preferred form of a reversible actuator is mounted within the compartment 48 of the frame 38 and is disposed therein to rotatably drive a horizontal drive shaft 75. The drive shaft 75 extends axially through the actuator 74 and has its opposite ends passing through the side walls 45 of the frame 38. The oppositely extending ends of the drive shaft 75 each have a sprocket 76 affixed thereto, with those sprockets 76 being coupled to the aligned sprockets 57, mounted on the stub shafts 56, by chains 77.

Thus, actuation of the hydraulic actuator 74 produces a rotation of the drive shaft 75 with that rotary motion being coupled to the stub shafts 56 by sprockets 57, 76, and chains 77, and thus resulting in the swinging or pivotal movement of the swing arm 58 through an arc of approximately 180°.

A remote source of hydraulic fluid under pressure (not shown) is coupled to the apparatus 20 by supply and return lines 80 and 81, respectively, shown in FIG. 3. The hydraulic fluid supplied through supply line 80 passes through a flow control device 82, which regulates the flow rate in the incoming direction and allows a free flow rate in the reverse direction, and is supplied to a switching valve 83 mounted on the undersurface of the lower shelf 47 of the frame 38. The switching valve 83 is preferrably a solenoid operated device that is remotely controlled, and when in the appropriate position, as will hereinafter be described, directs the hydraulic fluid to an outlet line 84 which supplies that fluid to an electrically actuated 4-way switching valve 85 (FIG. 8) mounted in the control compartment 48. In addition to the line 84 which directs the fluid to the switching valve 85, that valve 85 is provided with a fluid return line 86 which, as is customary, returns the fluid to the remote source (not shown). As seen in FIG. 8, the switching valve 85 is provided with a first flow line which includes: line 87, flow control device 88, cushioning valve 89 and line 90; and a second flow line which includes: line 91, flow control device 92, cushioning valve 89 and line 93. Both the first and second flow lines are connected between the switching valve 85 and the hydraulic actuator 74. In one position of the switching valve 85, fluid under pressure will be directed to the hydraulic actuator 74 through the first flow line, and will be returned therefrom through the second flow line, and with such a flow path, the actuator 74 will produce a rotation in one direction. In the other position of the switching valve 85, the flow direction will be exactly opposite to that described above, i.e., supply of fluid is through the second flow line and return is through the first flow line, and this opposite flow direction of the fluid results in an opposite rotational direction of the hydraulic actuator.

The flow control device 88 in the first flow line and the flow control device 92 in the second flow line are similar to the previously described flow control device 82 in that they both operate to control the fluid flow rate in the direction of its path to the hydraulic actuator 74, and to allow a free flow rate of the returning fluid. The cushioning valve 89, which is common to both the first and second flow lines, is a device well known in the art which acts to dampen or cushion the pressure of the fluid being supplied to the hydraulic actuator 74.

Air under pressure from a remote source (not shown) is directed to the apparatus 20 by an air inlet line 95 (FIGS. 3 and 8) which is coupled to a pressure regulator 96 mounted on the shelf 47 of the frame 38. Air at a predetermined pressure emerges from the regulator 96 through coupling 97 which directs that air to a 3-way electrically actuated switching valve 98 having an outlet port 99 and a vent port 100. When the 3-way switching valve 98 is appropriately actuated, as will be described, air will be directed to the outlet port 99 and pass through a line 101 to a 2-way switching valve 102 which, as seen in FIG. 3, is mounted to the underside of shelf 46. The 2-way switching valve 102 is a safety device which is open at all times when the apparatus 20 is operating, and will close only in the event of power failure to maintain air pressure in the air bags 65 and thus prevent undesired releasing of blocks during transferral thereof from the first conveyor 23 to the second conveyor 24, as will be described. Since the 2-way switching valve 102 is open, air will pass therethrough to a special tee 103 mounted on the outlet side of the valve 102. A pair of pressure lines 104 extend oppositely from the tee 103 and are connected to suitable fittings 105 mounted in the opposite side walls 45 of the frame 38. Pressure lines 106 are connected to the outwardly disposed ends of the fittings 105 and extend upwardly therefrom and are connected to swivel fittings 107 mounted in the extending ends of the stub shafts 56. The stub shafts 56 each have an axial passage 108 (FIG. 4) formed therethrough with the inwardly facing ends of those passages being fitted with fittings 109 which communicate with the air bags 65 as seen best in FIGS. 3 and 4.

Thus, air emerging from the 2-way switching valve 102 will be directed through the special tee 103 and the pressure lines described above, to the air bags 65 causing them to inflate, and move the friction pads 64 to their extended positions.

In addition to air being directed to the air bags 65 as described above, air will also emerge from the special tee 103 through line 110 for passage through a flow control device 111. The flow control device 111 allows a free flow of air in the direction from the tee 103 and restricts return flow to a predetermined rate. Air moving from the flow control device 111 is passed through an air resistor 112 to a pressure switch 113. The air resistor 112 is simply a device which presents a tortuous path to the flow of air in either direction. The pressure switch 113 is a two position diaphragm operated device which is actuated from its normal position when air pressure builds up to a predetermined value, say 25 psi, and will return to its normal position when the pressure drops to a second predetermined value, say 4 psi. The pressure switch 113 is employed for controlling certain operations of the apparatus 20 as will hereinafter be described in detail.

It may now be seen that the above described portions of the pneumatic system will operate to inflate the air bags 65 when the 3-way switching valve 98 is positioned to direct air from the regulator 96 to the outlet port 99 of the 3-way switching valve. When it is desired that the air bags 65 be deflated, to release the blocks 22, the 3-way valve 98 is switched so that air pressure in the bags 65, and associated lines, will be vented through the vent port 100 of the 3-way switching valve 98. Such venting will be rapid, however, the air pressure built up in the pressure switch 113 will be vented at a much slower controlled rate due to the restrictions imposed by the flow control device 111 and air resistor 112.

Figure 16:
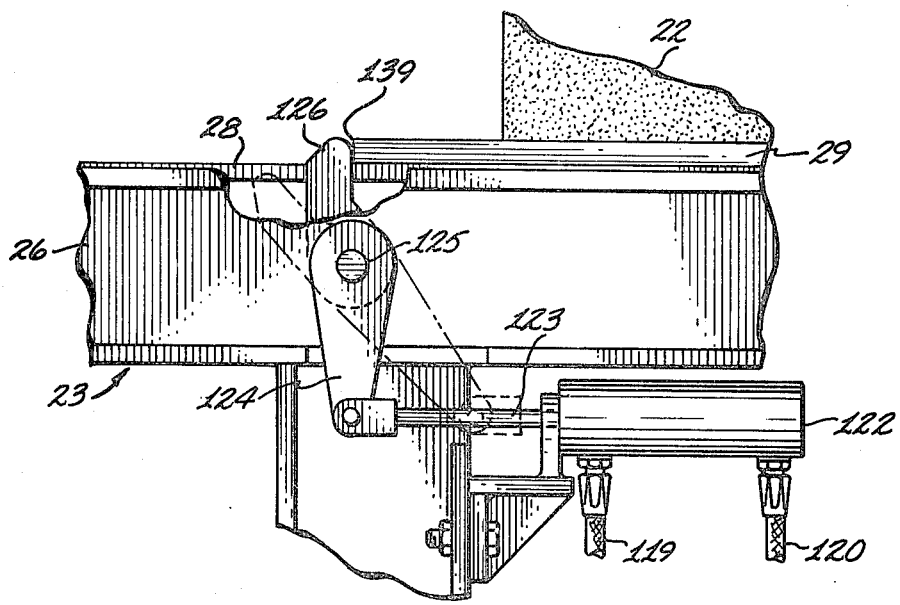
FIG. 16 is an enlarged fragmentary sectional view taken on the line 16—16 of FIG. 14 with portions broken away to show the various features thereof.

As shown in FIG. 8, air supplied to the apparatus 20 by the inlet line 95 is directed to a pressure line 116 in addition to being directed to the pressure regulator 96. That pressure line 116 is coupled to the inlet port 117 of an electrically actuated 4-way switching valve 118 shown in FIG. 3 to be mounted on the underside of the shelf 46. The switching valve 118 has a pair of pressure lines 119 and 120 which pass through the end wall 44 of the frame 38 and are coupled to a pneumatic cylinder 122 carried on the frame 26 of the first conveyor 23 as shown in FIGS. 14 and 16. The cylinder 122 is a conventional piston operated device having an extensible rod 123 which is coupled to a lever 124 mounted on one end of a shaft 125 rotatably carried in the frame 26 transverse to the length of the conveyor 23 and intermediate the endless belt 28. The shaft 125 has a pair of cam levers 126 mounted thereon in spaced relationship so as to be adjacent opposite sides of the upper portion of the endless belt 28. When the 4-way switching valve 118 is actuated so that air pressure is supplied to pressure line 119, the pneumatic cylinder 122 will move the rod 123 to its retracted position (dotted lines FIG. 16). In this state, the pressure line 120 acts as a return line which is in communication with a vent port 127 on the switching valve 118. When the switching valve 118 is actuated so that air pressure is directed to line 120, with the line 119 being a return line, the cylinder 122 moves the rod 123 to its extended position (solid lines FIG. 16). When the cylinder 122 is in the retracted position, the cam levers 126 will be disposed below the upper portion of the endless belt 28, and will move to positions of extending above the belt 28 when the cylinder 122 is extended. The cam levers 126 are employed for precision locating of the pallet 29 and blocks 22 as will hereinafter be described in detail.

The pneumatically operated cylinder 122 and the associated elements are but one way of assuring precise positioning of the blocks, as that objective could be accomplished by employing a fixed stop (not shown) which could take the form of a transverse rod spaced above the pallet so as to contact the blocks only, with that rod engaging the blocks near the lower ends thereof so as not to interfere with the action of the swing arm.

Referring once again to FIG. 4, a block sensing means in the preferred form of a photoelectric cell 130 is mounted on a suitable bracket 131 carried on the frame 26 of the first conveyor 23. A reflective mirror 132 is aligningly mounted on the frame 38 of the apparatus 20, with the alignment being such that when no blocks are present in what may be called the pick-up position, the photoelectric cell will see its reflection which constitutes a first state of that device. When blocks are moved into the pick-up position, the light beam 133, shown in broken line, will be interrupted by a corner of one of the blocks 22, and the interruption will cause the photoelectric cell to assume a second state, as is well known in the art.

It should be understood that the above described block sensing means in the form of the photoelectric cell 130 is the preferred structure for accomplishing the intended function. However, the same objective can be accomplished by employing a conventional position indicating switch (not shown).

As previously mentioned, and as shown in FIG. 1, the swing arm 58 of the block lift and turnover mechanism 50 will traverse an arc of approximately 180° with a back and forth motion. In operation, and for purposes of this description, the swing arm 58 will be in a vertical, or home position, during times when the lift and turnover mechanism 50 is not in operation, or is waiting for the blocks 22 and pallet 29 to arrive at the proper position on the first conveyor 23. This home or vertical positioning of the swing arm 58 is shown in dashed lines in FIG. 1 and is identified as position "A". When blocks 22 and pallet 29 are properly positioned on the conveyor 23, the swing arm 58 will move to the position identified as "B" and will continue movement to the block pick-up position identified as "C". After the blocks have been picked up, the swing arm 58 reverses direction and moves back through positions "B" and "A" to position "D" and continues to the delivery position identified as position "E".

At each of the above described positions of the swing arm 58, control functions are accomplished which will now be described in detail with specific reference to FIGS. 9 through 13.

Figure 9:
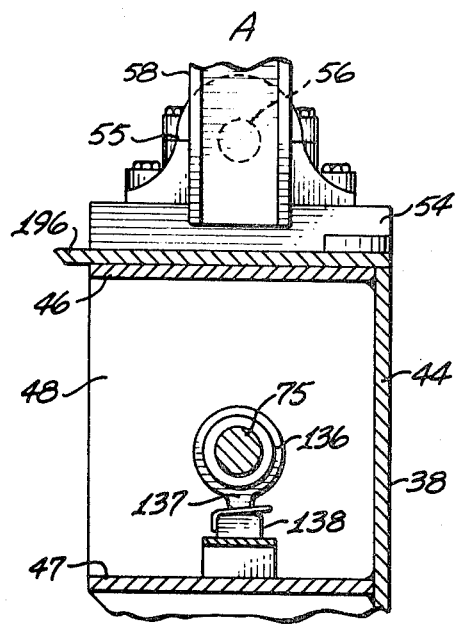
FIG. 9 is a fragmentary sectional view taken on the line 9—9 of FIG. 3 to illustrate the orientation of a first control cam relative to the swing arm of the apparatus of the present invention.

FIG. 9 illustrates the swing arm 58 in position "A" so that a first cam 136, affixed for rotation with the drive shaft 75, is positioned so that the lobe 137 is in contact with a first switch 138. This switch 138 is coupled through a suitable relay (not shown) and will appropriately position the 4-way switching valve 85 so that no hydraulic fluid under pressure is being delivered to the hydraulic actuator 74, thus, the swing arm 58 will be held in position "A". The photoelectric cell 130 will override the first switch 138 when the light beam 133 is interrupted which indicates the presence of blocks 22 at the pick-up position, and this overriding will appropriately position the 4-way switching valve 85 to drive the actuator 74 and move the arm 58 toward position "B".

Before proceeding with the description of the control functions accomplished at position "B", it is deemed necessary to describe the multiple functions accomplished by the photoelectric cell 130. Therefore, when blocks 22 and pallet 29 are moved along the first conveyor 23 to a position which interrupts the light beam 133, the cell 130 is moved to its second state as previously described. The second state of the cell 130, in addition to overriding the first switch 138, will shut off power to the first conveyor 23 which, due to coasting, will bring the blocks and pallet to rest a short distance beyond the pick-up position. The photoelectric cell 130 is additionally coupled through another relay (not shown) which appropriately positions the 4-way switching valve 118 which actuates the pneumatic cylinder 122 causing the cam levers 126 to move into engagement with the leading edge 139 (FIG. 16) of the pallet 29 to move that pallet, and the blocks 22 carried thereon, backwardly to the pick-up position.

Figure 10:
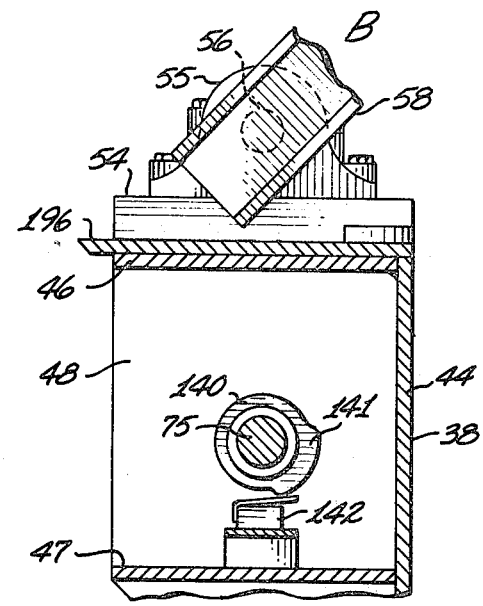
FIG. 10 is a view similar to FIG. 9 showing the orientation of a second control cam relative to the swing arm of the apparatus of the present invention.

FIG. 10 illustrates the swing arm 58 as having moved from position "A" to position "B" whereat a second cam 140, also affixed to the drive shaft 75, is positioned so that its lobe 141 is in contact with a second switch 142. The second switch 142 is suitably electrically coupled to hold the first conveyor 23 immobile during movements of the swing arm 58 to position "C" and back to position "B". The need for this apparently redundant function will be seen upon consideration of the fact that when the blocks 22 have been picked up, the photoelectric cell 130 will sense the absence of blocks and, if it weren't for the second switch 142, would reconnect the power to the first conveyor 23 causing it to move the next pallet and blocks into the pick-up position. If this were allowed to occur, the oncoming blocks could move into contact with the swing arm 58 during its movement from position "C" back to position "B". Thus, the enlarged lobe 141 of the second cam 140 will actuate the second switch 142 to insure that the first conveyor 23 is inoperative until the swing arm 58 has had time to move from position "B" to position "C" and back to position "B".

Figure 11:
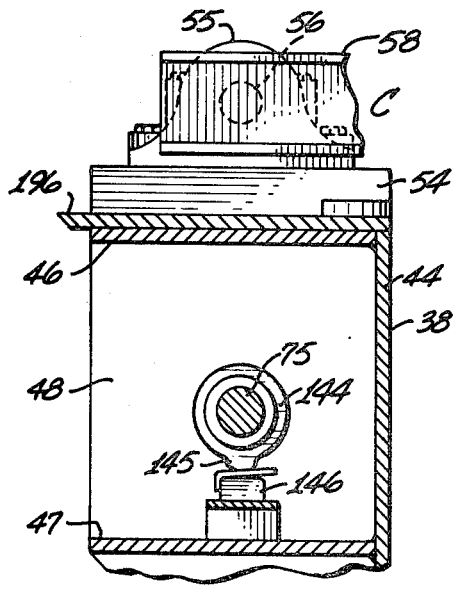
FIG. 11 is a view similar to FIG. 9 showing the orientation of a third control cam relative to the swing arm of the apparatus of the present invention.

FIG. 11 illustrates the swing arm 58 as having arrived at position "C" which positions a third cam 144, mounted on the drive shaft 75, so that its lobe 145 is in contact with a third switch 146. When the third switch is thus actuated, it will in turn actuate a suitable latching relay (not shown) which appropriately positions the 3-way switching valve 98 to cause inflation of the air bags 65. When the air pressure in the air bags and associated lines builds up to the previously described first predetermined value, the pressure switch 113 will be actuated as previously described. The air pressure switch 113 is suitably coupled to the 4-way switching valve 85 so that upon actuation of the pressure switch 113, the hydraulic actuator 74 will be operated in the reverse direction to move the swing arm 58, with the blocks 22 clampingly held thereby, back toward the second conveyor 24.

Reverse movement of the swing arm 58 from position "C" will allow movment of the first conveyor 23 to commence when the arm 58 reaches position "B" as described above. The latching relay (not shown) which was actuated by the third switch 146 is suitably wired to override the first switch 138 which would otherwise cause the swing arm 58 to stop at position "A". Thus, the swing arm 58 will move through position "A", in the reverse direction, to position "D".

Figure 12:
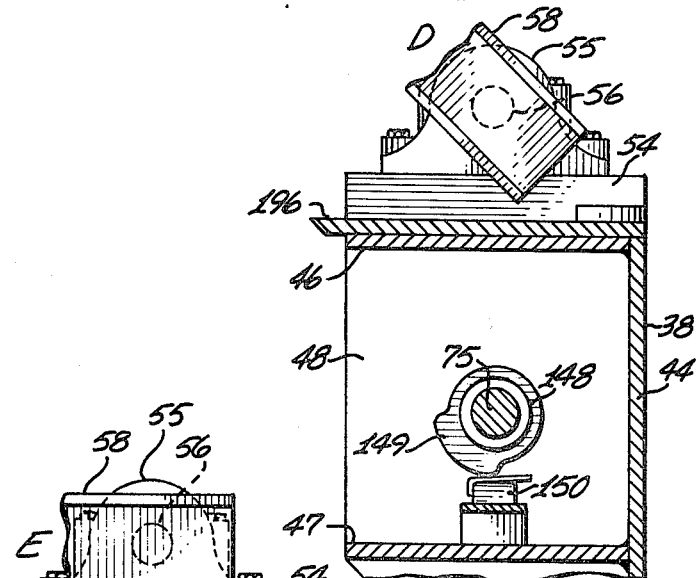
FIG. 12 is a view similar to FIG. 9 showing the orientation of a fourth control cam relative to the swing arm of the apparatus of the present invention.

FIG. 12 illustrates the swing arm 58 as having arrived at position "D" whereat a fourth cam 148, mounted on the drive shaft 75, is positioned so that its lobe 149 is in engagement with a fourth switch 150. This fourth switch is coupled to the power supply (not shown) of the second conveyor 24 and will interrupt movement of the conveyor 24 when the swing arm 58 passes through position "D".

Figure 13:
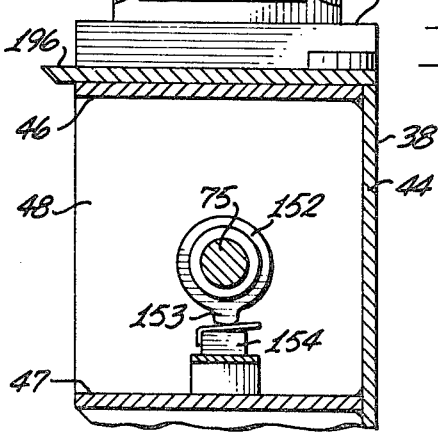
FIG. 13 is a view similar to FIG. 9 showing the orientation of a fifth control cam relative to the swing arm of the apparatus of the present invention.

FIG. 13 illustrates the swing arm 58 as having arrived at position "E" whereat a fifth cam 152, mounted on the drive shaft 75, is positioned so that its lobe 153 is in engagement with a fifth control switch 154. When this fifth switch 154 is actuated it will deactivate the latching relay (not shown), which was actuated by the third control switch 146 as previously described, and such deactivation will appropriately position the 3-way switching valve 98 so that the air pressure in the air bags 65 will be vented, it will be exhausted at a controlled rate from the pressure switch 113 as previously described, to insure that the blocks 22 have been fully released, and when that pressure reaches the second predetermined value, the pressure switch 113 will be deactivated at which time the 4-way switching valve 85 will be returned to the position which directs hydraulic fluid to the hydraulic actuator 74 causing it to move the swing arm 58 back toward position "A".

When the swing arm 58 moves from position "E" toward position "A", it will pass through position "D" where the fourth cam 148 will become disengaged from the fourth switch 150, thus allowing the second conveyor 24 to resume its movement and carry the blocks, which have been deposited thereon in an inverted position, to a cubing station (not shown). When the swing arm 58 arrives at position "A", the block lift and turnover mechanism 50 will be ready to repeat its operational cycle, and will continue to repeat as long as blocks are delivered to the pick-up position by the first conveyor 23.

As previously described, in many instances it is desirable to transfer the blocks with a turnover movement, however, in other instances a push-off movement is preferred. Therefore, the combination lift turn-over/push-off block transfer apparatus 20 of the present invention is provided with the integral block push-off mechanism 52 as seen best in FIGS. 1, 2, 14 and 15.

The block push-off mechanism 52 is provided with an elongated rail 160 which is affixed on one end thereof to an upstanding spacer 161 carried on one of the previously described spacers 54 mounted atop the frame 38. The rail 160 extends from the frame 38 so as to be spaced above the endless belt 28 of the first conveyor 23, and is transverse to the path of movement of the conveyor 23. Intermediate the opposite ends of the elongated rail 160, a suitable brace 162 is provided which depends therefrom and is suitably affixed to the frame 26 of the first conveyor 23 to rigidly support the extending end of the rail 160. The extending end of the rail 160 has a plate 163 mounted thereon which supports a suitable reversible hydraulic motor 164 having an output shaft 165 upon which a drive sprocket 166 is mounted. The sprocket 166 is in driving engagement with a chain 167 which has one of its ends 168 connected to a carriage 169 which will hereinafter be described. The chain 167 extends from the carriage 169 and passes over the drive sprocket 166 which reverses its direction and positions the chain below the rail 160 and parallel therewith. The chain extends the full length of the rail and passes around an idler sprocket 170 carried on one of the stub shafts 56 mounted atop the frame 38. The idler sprocket 170 is freely mounted on the stub shaft 56 so as to rotate independently of that shaft. After passing around the idler sprocket 170, the chain 167 extends along the top of the elongated rail 160 and has its opposite end 171 suitably coupled to the carriage 169.

Thus, when the hydraulic motor 164 is actuated in a first direction, counterclockwise in FIG. 14, the drive sprocket 166 will move the chain 167 and cause the carriage 169 to move along the rail 160 in a direction which is toward the first conveyor 23. Similarly, when the hydraulic motor is actuated in the reverse direction, clockwise in FIG. 14, the carriage 169 will move back to the extended end of the rail 160.

Actuation of the hydraulic motor 164 is controlled by an electrically operated 4-way switching valve 174 which, as seen best in FIG. 14, is suitably mounted on the brace 162. The 4-way switching valve 174 is provided with a pair of hydraulic pressure lines 175 and 176 which are coupled to the hydraulic motor 164 to accomplish the reversible driving of that motor as well known in the art. Hydraulic fluid under pressure is supplied to the 4-way switching valve 174 by a supply pressure line 177 which extends between the valve 174 and the previously described switching valve 83 (FIG. 3). When the switching valve 83 is positioned to supply hydraulic fluid under pressure to the outlet line 84 coupled thereto, that fluid will be directed to the block turnover mechanism 50 as previously described. When the switching valve 83 is appropriately positioned, the hydraulic fluid under pressure will be switched from the outlet line 84 and directed to the supply pressure line 177 coupled to the 4-way switching valve 174. In addition to the supply pressure line 177, the 4-way switching valve 174 has a fluid return line 178 which returns the fluid to the remote source (not shown).

The carriage 169 includes a body member 180 having a plurality of suitable rollers 181 thereon which engage various parts of the elongated rail 160 to allow rolling movement of the carriage along the rail. The carriage body 180 has a normally extending plate 182 integrally affixed thereon and suitably braced by an angularly disposed gusset plate 183. A pusher assembly 186 is vertically adjustably attached, such as by bolts 187, to the normally extending plate 182 of the carriage body, and the pusher assembly includes a frame member 188 having an elongated friction pad 190 demountably attached thereto.

As seen in FIG. 15, the carriage body 169 has a switch contacting arm 191 mounted thereon so that when the carriage is moved along the rail 160 to its retracted position, i.e., away from the first conveyor 23, the arm 191 will move into contact with a pair of control switches 192 and 193 which are suitably mounted on the rail 160 adjacent the extending end thereof. When the carriage 169 is moved to its extended position, i.e., toward the first conveyor, the contact arm 191 will move into engagement with a third control switch 194 carried on the rail 160 adjacent the opposite end thereof. The control functions accomplished by the first, second, and third control switches 192, 193, and 194 will be fully described in the following detailed description of the operation of the push-off mechanism 52.

As previously described, when a plurality of blocks carried on the pallet 29 are moved by the first conveyor 23, the arrival thereof at the off-loading position is detected by the photoelectric cell 130. Such detection will switch the cell 130 to its second state which interrupts power to the first conveyor 23 and by actuation of the pneumatic cylinder 122 (FIG. 16) positions the blocks and pallet in a precise location on the conveyor 23. When the switching valve 83 is positioned so as to enable the push-off mechanism 52, and disable the turnover mechanism 50, actuation of the photoelectric cell 130 to its second state will set the previously described latching relay (not shown) which in this operating mode will position the 4-way switching valve 174 so that it applies hydraulic fluid under pressure to the hydraulic motor 164 driving it in the counterclockwise direction (FIG. 14) which moves the carriage 169 to its extended position. When the carriage 169 begins its movement from the retracted position, the contact arm 191 will disengage from the first control switch 192 causing it to open and hold the first conveyor 23 inoperative during the entire cycle of the push-off mechanism. Again, this apparently redundent function is necessary due to the fact that although movement of the first conveyor 23 was stopped upon switching of the photoelectric cell 130 to its second state, that cell 130 will revert to its first state when the blocks are moved out of the path of the light beam 133.

As the carriage 169 moves toward its extended position, the friction pad 190 of the pusher assembly 186 will move into contact with the blocks and push them off of the pallet 29 across a wear plate 196 mounted atop the upper shelf 46 of the frame 38, and onto the endless belt 33 of the second conveyor 24. When this push-off movement is completed, the carriage 169 will have moved to its fully extended position which causes the contact arm 191 to come into engagement with the third control switch 194. The third control switch 194 is coupled to the latching relay (not shown) and upon actuation thereof by the arm 191 will unlatch that relay causing the 4-way switching valve 174 to reverse the flow direction of hydraulic fluid to the hydraulic motor 164. The motor will then reverse its driving motion and cause the carriage 169 to return to its retracted position. Upon returning to the retracted position the contact arm 191 carried on the carriage 169 will move into engagement with the first and second control switches 192 and 193. Such action will close the first control switch 192 thus starting movement of the first conveyor 23 to bring more blocks into the off-loading position. The simultaneous engagement of the second control switch 193 by the arm 191 will appropriately position the 4-way switching valve 174 to interrupt all flow of hydraulic fluid under pressure to the hydraulic motor 164.

The push-off mechanism 52, after completing a full cycle as described above will repeat such cycles each time that the photoelectric cell 130 is switched into its second state.

While the principles of the invention have now been made clear in an illustrated embodiment, there will be immediately obvious to those skilled in the art, many modifications of structure, arrangements, proportions, the elements, materials, and components used in the practice of the invention, and otherwise, which are particularly adapted for specific environments and operation requirements without departing from those principles.

For example, although the clamping means 63 are shown as including pneumatically actuated air bags 65, the same function could be accomplished mechanically with motor driven cams (not shown).

The appended claims are therefore intended to cover and embrace any such modifications within the limits only of the true spirit and scope of the invention.

What I claim is:

1. An apparatus for removing a plurality of cementitious blocks from a pallet on a first conveyor and transferring those blocks to a second conveyor in either an inverted or upright position, said apparatus comprising:
   (a) a frame for aligned positioning between a block pick-up position on the first conveyor and a block delivery position on the second conveyor, said frame including a flat plate disposed between the block pick-up position on the first conveyor and the block delivery position on the second conveyor;
   (b) a block lift and turn-over mechanism mounted on said frame for liftingly removing the plurality of blocks from the pallet on the first conveyor and transferring those blocks to the second conveyor in an inverted position;
   (c) a block push-off mechanism mounted on said frame for pushing the plurality of blocks from the pallet on the first conveyor onto the top plate of said frame and slidingly moving the blocks across that plate onto the second conveyor; and
   (d) switching means on said frame for deactivating said block push-off mechanism in a retracted inoperative position during operation of said block lift and turn-over mechanism and for deactivating said block lift and turn-over mechanism in an inoperative position which provides an unobstructed path across the top plate of said frame during operation of said block push-off mechanism.

2. An apparatus as claimed in claim 1 wherein said block lift and turnover mechanism comprises:
   (a) a swing arm pivotably mounted on said frame for reciprocal movement in a vertical plane through an arc of approximately 180° between the block pick-up position on the first conveyor and the block delivery position on the second conveyor;
   (b) drive means on said frame and coupled to said swing arm for reciprocal driving thereof;
   (c) clamp means mounted on said swing arm for actuation to a block clamping position and actuation to a block releasing position; and
   (d) control means on said frame and coupled to said clamp means for actuating said clamp means to the block clamping position when said swing arm is driven to the block pick-up position and for actuating said clamp means to the block releasing position when said swing arm is driven to the block delivery position.

3. An apparatus as claimed in claim 1 wherein said block lift and turnover mechanism comprises:
   (a) a swing arm pivotably mounted on said frame for reciprocal movement in a vertical plane through an arc of approximately 180° between the block pick-up position on the first conveyor and the block delivery position on the second conveyor, said swing arm having a pair of parallel legs which are spaced apart a distance somewhat larger than the length dimension of the cementitious blocks and each having a length somewhat longer than three of the cementitious blocks arranged in side by side relationship;
   (b) drive means on said frame and coupled to said swing arm for reciprocal driving thereof;
   (c) friction pad means carried on each of the legs of said swing arm so that said friction pad means on one of the legs alignedly faces said friction pad means in the other of the legs;
   (d) friction pad moving means positioned between each of the legs of said swing arm and their respective ones of said friction pad means for extending said friction pad means into a block clamping position and for retracting said friction pad means into a block releasing position; and
   (e) control means mounted on said frame and coupled to said friction pad moving means for extending said friction pad means when said swing arm is driven to the block pick-up position and for retracting said friction pad means when said swing arm is driven to the block releasing position.

4. An apparatus as claimed in claim 1 wherein said block push-off mechanism comprises:
   (a) an elongated rail mounted on said frame and extending therefrom for positioning adjacent the block pick-up position on the first conveyor;
   (b) carriage means mounted on said rail for reciprocal movement along the length thereof;

(c) block pusher means mounted on said carriage means; and (d) drive means on said rail and coupled to said carriage means for reciprocally moving said carriage means and said block pusher means through the block pick-up position on the first conveyor toward the block delivery position on said second conveyor.

5. An apparatus for simultaneously removing a plurality of cementitious blocks from a pallet on a first conveyor and transferring those blocks to a second conveyor, said apparatus comprising:

(a) a pallet having a plurality of cementitious blocks thereon in side by side relationship;

(b) a first conveyor for moving said pallet and blocks to a predetermined pick-up position thereon;

(c) a second conveyor having a block receiving end which is aligningly spaced from the pick-up position of said first conveyor;

(d) a frame positioned between the pick-up position of said first conveyor and the block receiving end of said second conveyor;

(e) a swing arm pivotably mounted on said frame for reciprocal movement in a vertical plane through an arc of approximately 180° between the pick-up position of said first conveyor and the block receiving end of said second conveyor;

(f) first drive means mounted on said frame and coupled to said swing arm for reciprocal driving thereof;

(g) clamp means mounted on said swing arm for actuation to a block clamping position and actuation to a block releasing position;

(h) control means on said frame and coupled to said clamp means for actuating said clamp means to the block clamping position when said swing arm is drivingly moved to the pick-up position of said first conveyor and for actuating said clamp means to the block releasing position when said swing arm is drivingly moved to the block receiving end of said second conveyor;

(i) an elongated rail mounted on said frame and extending therefrom adjacent the pick-up position of said first conveyor;

(j) carriage means mounted on said rail for reciprocal movement along the length thereof;

(k) block pusher means mounted on said carriage means;

(l) second drive means mounted on said rail and coupled to said carriage means for reciprocally moving said carriage means and said block pusher means through the pick-up position of said first conveyor toward the block receiving end of said second conveyor; and (m) switching means mounted on said frame and coupled to said first drive means and to said second drive means for selective driving of said swing arm and said carriage means.

6. An apparatus as claimed in claim 5 and further comprising:

(a) sensing means on said first conveyor for detecting the arrival of said pallet and blocks at the pick-up position of said first conveyor and producing an output signal upon the occurrence of that arrival;

(b) said output signal coupled to enable said first drive means when said switching means is supplying driving power to said first drive means; and (c) said output signal coupled to enable said second drive means when said switching means is supplying driving power to said second drive means.

* * * * *